(12) United States Patent
Chontos

(10) Patent No.: US 6,345,448 B1
(45) Date of Patent: Feb. 12, 2002

(54) COMBINATION PROTRACTOR/CHALK LINE DEVICE

(76) Inventor: Jeffrey A. Chontos, 38 Botsford Hill Rd., Newtown, CT (US) 06470

( * ) Notice: Subject to any disclaimer, the term of this patent is extended or adjusted under 35 U.S.C. 154(b) by 0 days.

(21) Appl. No.: 09/298,429

(22) Filed: Apr. 23, 1999

(51) Int. Cl.⁷ .............................. G01C 9/00; B44D 3/38
(52) U.S. Cl. .............................. 33/339; 33/414; 33/334
(58) Field of Search .......................... 33/333, 334, 339, 33/354, 369, 391, 413, 414, 756

(56) References Cited

U.S. PATENT DOCUMENTS

| | | | | |
|---|---|---|---|---|
| 749,976 A | * | 1/1904 | Turner | 33/354 |
| 955,799 A | * | 4/1910 | Holbrook | 33/354 |
| 997,803 A | | 7/1911 | Giffin | |
| 1,004,443 A | * | 9/1911 | Laut | 33/414 |
| 1,113,805 A | * | 10/1914 | McNeil | 33/354 |
| 1,203,012 A | * | 10/1916 | Klass | 33/354 |
| 3,046,663 A | * | 7/1962 | Romero | 33/354 |
| 3,126,637 A | | 3/1964 | Short | |
| 3,568,322 A | * | 3/1971 | Showers | 33/413 |
| 4,188,729 A | * | 2/1980 | Peterson | 33/332 |
| 4,189,844 A | * | 2/1980 | Riggins, Sr. | 33/414 |
| 4,381,607 A | * | 5/1983 | Place | 33/339 |
| 4,438,538 A | * | 3/1984 | Larsen | 33/414 |
| 4,697,349 A | * | 10/1987 | Lee | 33/414 |
| 4,731,933 A | * | 3/1988 | Cope | 33/414 |
| 5,119,565 A | * | 6/1992 | Horvath et al. | 33/414 |
| 5,138,771 A | | 8/1992 | Lee | |
| 5,239,761 A | * | 8/1993 | Wu et al. | 33/414 |
| 5,699,622 A | * | 12/1997 | Umbro | 33/414 |

FOREIGN PATENT DOCUMENTS

| | | | | |
|---|---|---|---|---|
| FR | 0861917 | * | 2/1941 | 33/339 |
| GB | 271484 | * | 5/1927 | 33/339 |

* cited by examiner

*Primary Examiner*—Diego Gutierrez
*Assistant Examiner*—Lydia M. De Jesús
(74) *Attorney, Agent, or Firm*—John H. Crozier

(57) ABSTRACT

In a preferred embodiment, a combination protractor/chalk line device, including: a housing; a chalk line string disposed in the housing and withdrawable from the housing at a first end of the housing; a manually graspable handle loosely attached to the housing; a protractor disposed on a side of the housing; and the combination protractor/chalk line being arranged such that, when the chalk line string is withdrawn from the housing and held taut and the handle is grasped, the protractor will indicate an angle from horizontal defined by the chalk line string.

8 Claims, 4 Drawing Sheets

COMBINATION PROTRACTOR/CHALK LINE DEVICE

BACKGROUND OF THE INVENTION

1. Field of the Invention

The present invention relates to protractors and chalk lines generally and, more particularly, but not by way of limitation, to a novel combination protractor/chalk line device.

2. Background Art

Both protractors and chalk lines are well known devices.

Protractors are of various types, but all are employed to measure angles, the simplest protractor being of planar form and having thereon an arcuate scale. An origin point on the protractor is placed at the intersection of two lines, for example, and the angle between the two lines is read from their positions relative to the scale.

Chalk lines are used to mark a straight line at a selected location on a substrate. Typically, a chalk line string is disposed in a housing in which a quantity of colored chalk is also disposed. As the chalk line string is withdrawn from the housing, it is coated with the colored chalk. The chalk line string is then placed tautly against the substrate and snapped against the substrate, thus marking the substrate with a colored line.

Known chalk line devices with or without measuring elements are as follows:

U.S. Pat. No. 997,803, issued Jul. 11, 1911, to Giffin, and titled CHALK LINE HOLDER, describes a combination chalk line and tape measure housing from which a chalk line and a tape measure may be selectively withdrawn. In one position of the housing, the line is chalked when it is withdrawn, while in another position, the line is withdrawn without being chalked. The only measurement function of the device is linear measurement with the tape measure.

U.S. Pat. No. 3,126,637, issued Mar. 31, 1964, to Short, and titled DUAL LINE CHALK BOX, describes a chalk line dispenser that has two chalk line reels disposed on a single shaft. The chalk lines are selectively used and, preferably, are coated with different colored chalks so that lines of different colors may be laid out by different tradesmen to reduce the possibility of confusion on a project. The device has no angle measurement function.

U.S. Pat. No. 4,731,933, issued Mar. 22, 1988, to Cope, and titled PROTRACTOR-CHALKLINE, describes a combination chalk line and protractor in which the chalk line itself is used as the protractor "needle" after the chalk line is withdrawn past a scale of angles. A disadvantage of the device is that the housing thereof must be placed against a surface and cannot be freely held when an angle measurement is made.

U.S. Pat. No. 5,138,771, issued Aug. 18, 1992, to Lee, and titled THREE DIMENSIONAL HOMOLOGOUS SURVEYING INSTRUMENT, describes a surveying device which is related to the present invention in that it employs a pendulum device.

Accordingly, it is a principal object of the present invention to provide a combination protractor/chalk line device that includes both the function of angle measurement and the function of line marking.

It is a further object of the invention to provide such a combination protractor/chalk line device that is economically constructed.

It is an additional object of the invention to provide such a combination protractor/chalk line device that is easy to use.

It is another object of the invention to provide such a combination protractor/chalk line device in which the protractor function may be used while the device is freely held and contact with an element being measured is not required.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a combination protractor/chalk line device, comprising: a housing; a chalk line string disposed in said housing and withdrawable from said housing at a first end of said housing; manually graspable handle means loosely attached to said housing; a protractor disposed on a side of said housing; and said combination protractor/chalk line being arranged such that, when said chalk line string is withdrawn from said housing and held taut and said handle means is grasped, said protractor will indicate an angle from horizontal defined by said chalk line string.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
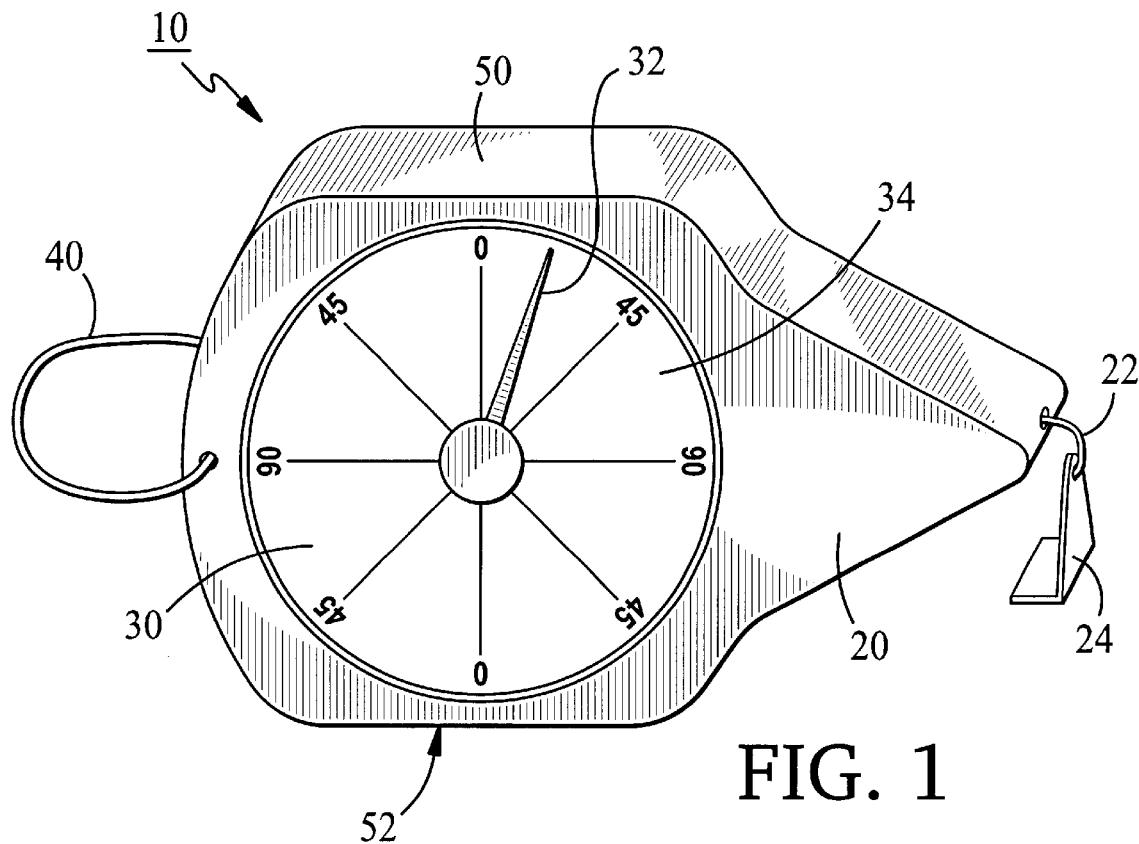
FIG. 1 is an isometric view of one side of a combination protractor/chalk line device constructed according to the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a combination protractor/chalk line device, generally indicated by the reference numeral 10, and constructed according to the present invention.

Device 10 includes a lightweight housing 20 from one end of which housing extends a chalk line string 22. A string clip 24 is attached to the distal end of chalk line string 22. Device 10 as so far described is conventional and it will be understood that chalk line string 22 may be manually withdrawn from housing 20 and that the housing includes a reel therein (not shown) on which chalk line string 22 is wound and that rotation of the reel in one direction will cause the chalk line string to be drawn into the housing. It will also be understood that housing 20 contains therein a quantity of chalk which coats chalk line string 22 so that the chalk line string when withdrawn from the housing may be used to mark a line on a substrate in a conventional manner.

Mounted on one side of housing 20 is a protractor mechanism 30 having an indicator needle 32 and a scale of angles 34 on which may be read the angle to which the indicator needle is pointing. Protractor mechanism 30 is of the type in which indicator needle 32 is attached to a pendulum (not shown) which causes the indicator needle to rotate with respect to scale of angles 34 and to always point vertically. Thus, if protractor mechanism 30 is rotated 45 degrees with respect to horizontal, indicator needle 32 will point to "45" degrees on scale of angles 34. Such type of protractor is available, for example, as a Pro Crafter Angle Finder, furnished by Macklanburg-Duncan.

Loosely attached to the end of housing 20 opposite to that from which chalk line string 22 extends is a manually graspable loop, or handle, 40. Loop 40 may take various forms, but it is important to the practising of the present invention that the loop be loosely attached to housing 20. It is also to be noted that the point of attachment of loop 40 to housing 20, the point on the housing at which chalk line string 22 exits the housing, and the points "90" degrees and "90" degrees on scale of angles 34 are aligned or lie in a common plane.

Housing 20 is also provided with oppositely disposed flat surfaces 50 and 52, the flat surfaces being parallel to the line defined by the points "90" degrees and "90" degrees on scale of angles 34.

Figure 2:
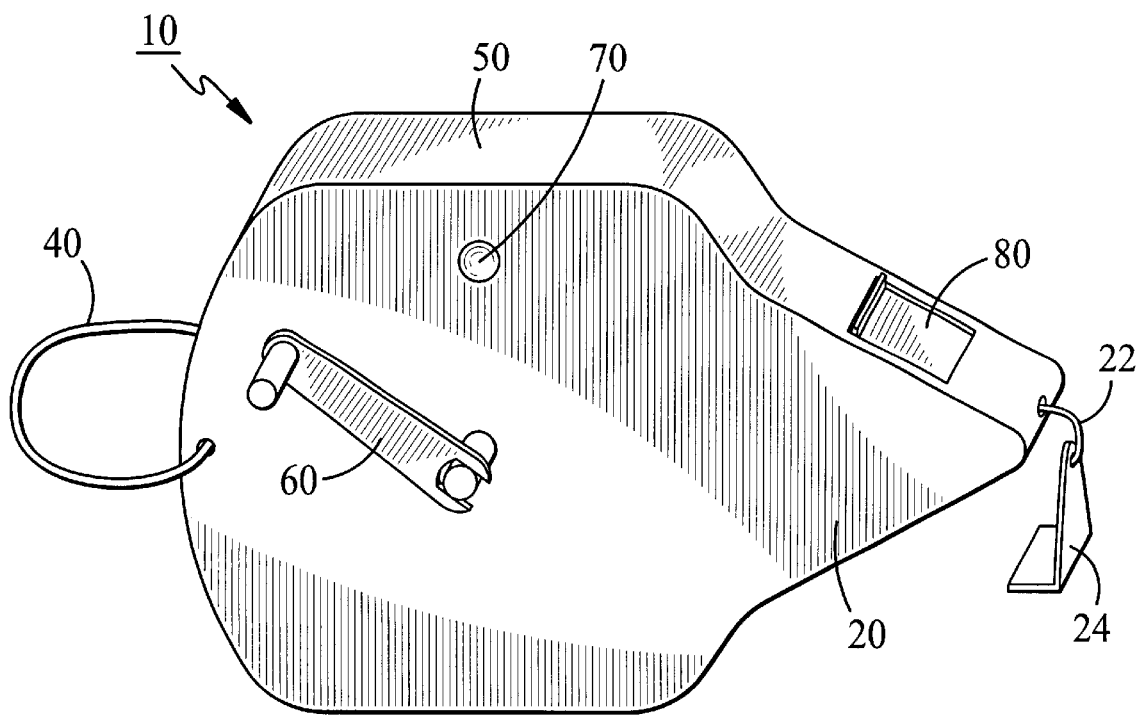
FIG. 2 is an isometric view of the other side of the combination protractor/chalk line device of FIG. 1.

FIG. 2 illustrates the rear of combination protractor/chalk line device 10 and, in addition to the elements shown which are described above, there is provided a crank handle 60 which is attached to the internal reel (not shown) such that manual rotation of the crank handle will cause chalk line string to be drawn into housing 20. Manual grasping of crank handle 60 and holding the same in rigid position will also cause the withdrawal of chalk line string 22 to be terminated. Also provided is a detent 70 into which the distal end of crank handle can be inserted, after the crank handle is flipped over in a conventional manner, so as to rigidly secure the crank handle without the need for manual grasping thereof. A conventional slide-covered opening 80 is provided for the introduction into housing 20 of powdered chalk (not shown).

Figure 3:
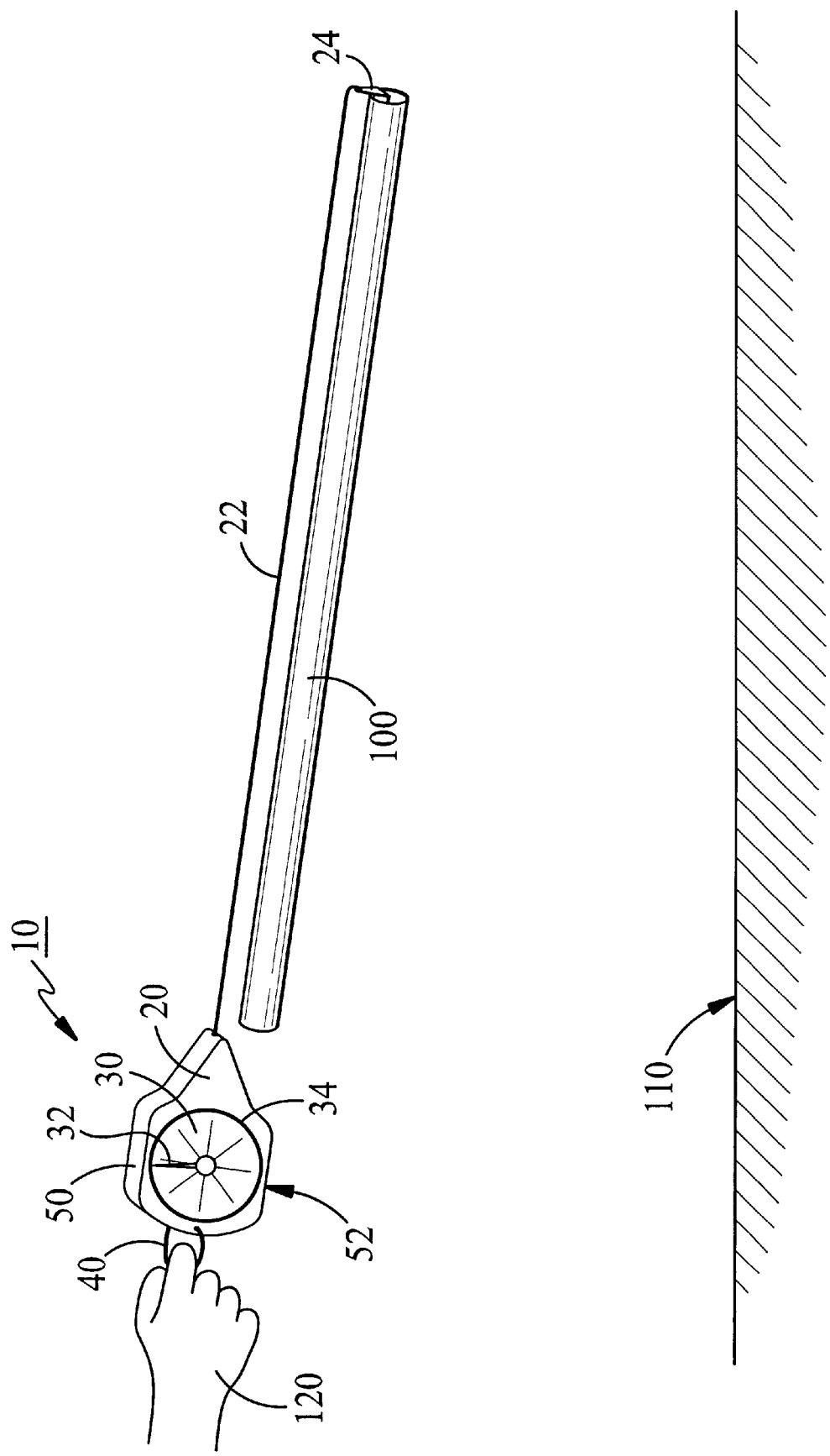
FIG. 3 is a side elevational view of the combination protractor/chalk line device being used to measure the angle of an object.

FIG. 3 illustrates combination protractor/chalk line device 10 being used to measure the angle of a length of pipe 100. Pipe 100 is shown disposed above a horizontal surface 110 to indicate that the pipe is, indeed, angled with respect to horizontal. As shown, chalk line string 22 has been withdrawn from housing 20 and string hook 24 attached to the end of pipe 100. Loop 40 is then manually grasped by a hand 120 of a user and chalk line string 22 is tautly stretched along and parallel to pipe 100. Tautly drawing chalk line string 22 causes the attachment point of loop 40, the chalk line string, and the line defined by the "90" degrees and "90" degrees points on scale of angles 34 to be aligned or to lie in a common plane. Since indicator needle 32 always points vertically and is therefore orthogonal to horizontal surface 110, the indicator needle points to the angle on scale of angles 34 that represents the angle of pipe 100 with respect to the horizontal surface.

Rather than measuring the angle of an object, such as pipe 100 (FIG. 3), combination protractor/chalk line device 10 may be employed to measure the angle of grading of earth as well as a number of other angles.

Figure 4:
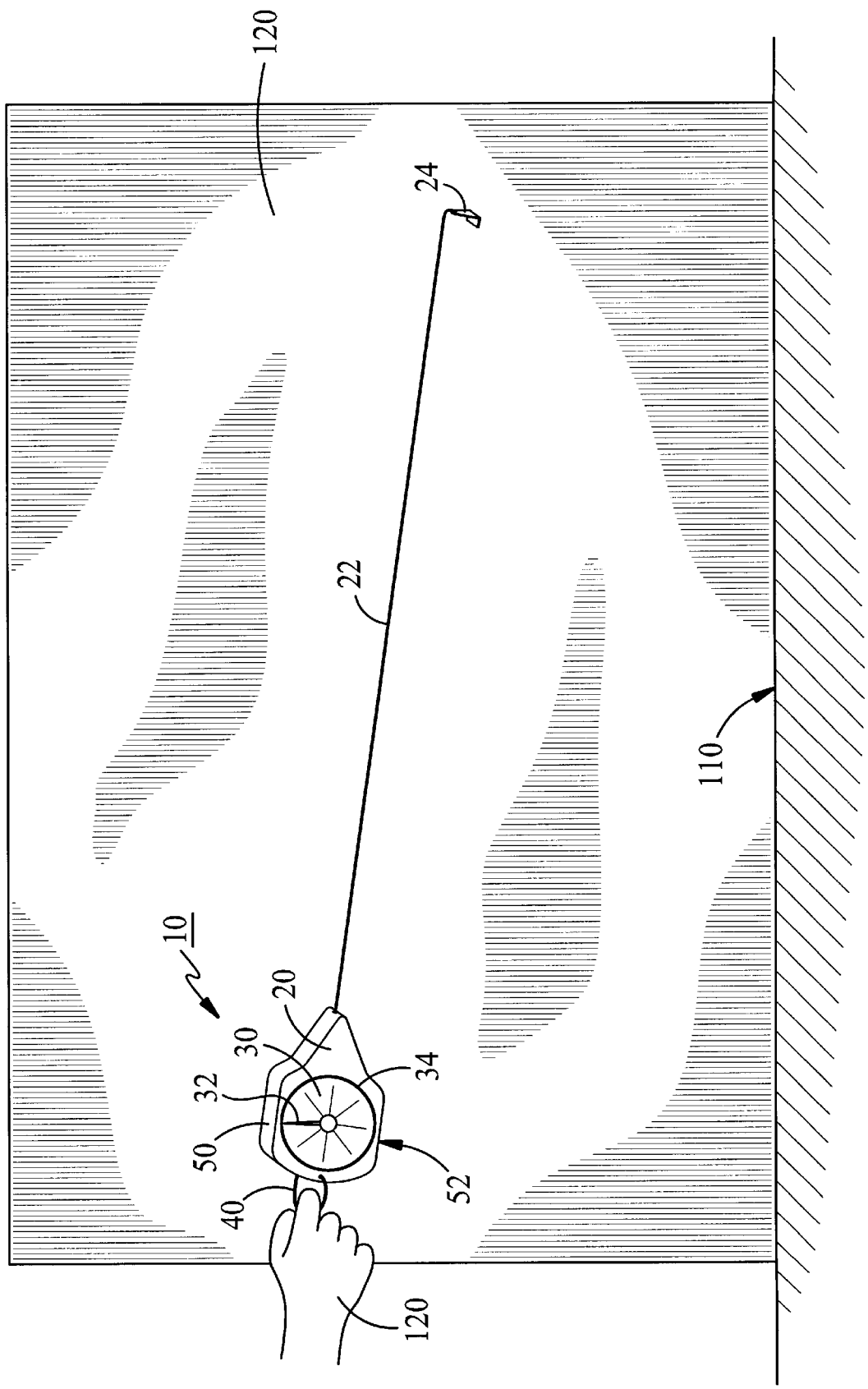
FIG. 4 is a side elevational view of the combination protractor/chalk line device being used to mark an angled line on a surface.

As is illustrated on FIG. 4, combination protractor/chalk line device 10 may also be employed to mark an angled line on a wall 120. Here, chalk line string 22 is tautly stretched along and against wall 120, with string hook 24 attached to or held at a point on the wall distant from housing 20. With the desired angle being indicated by indicator needle 32 on scale of angles 34, chalk line string 22 is snapped against wall 120 to mark a line thereon which line is angled with respect to horizontal surface 110. Note that wall 120 does not have to be orthogonal to horizontal surface 110.

Figure 5:
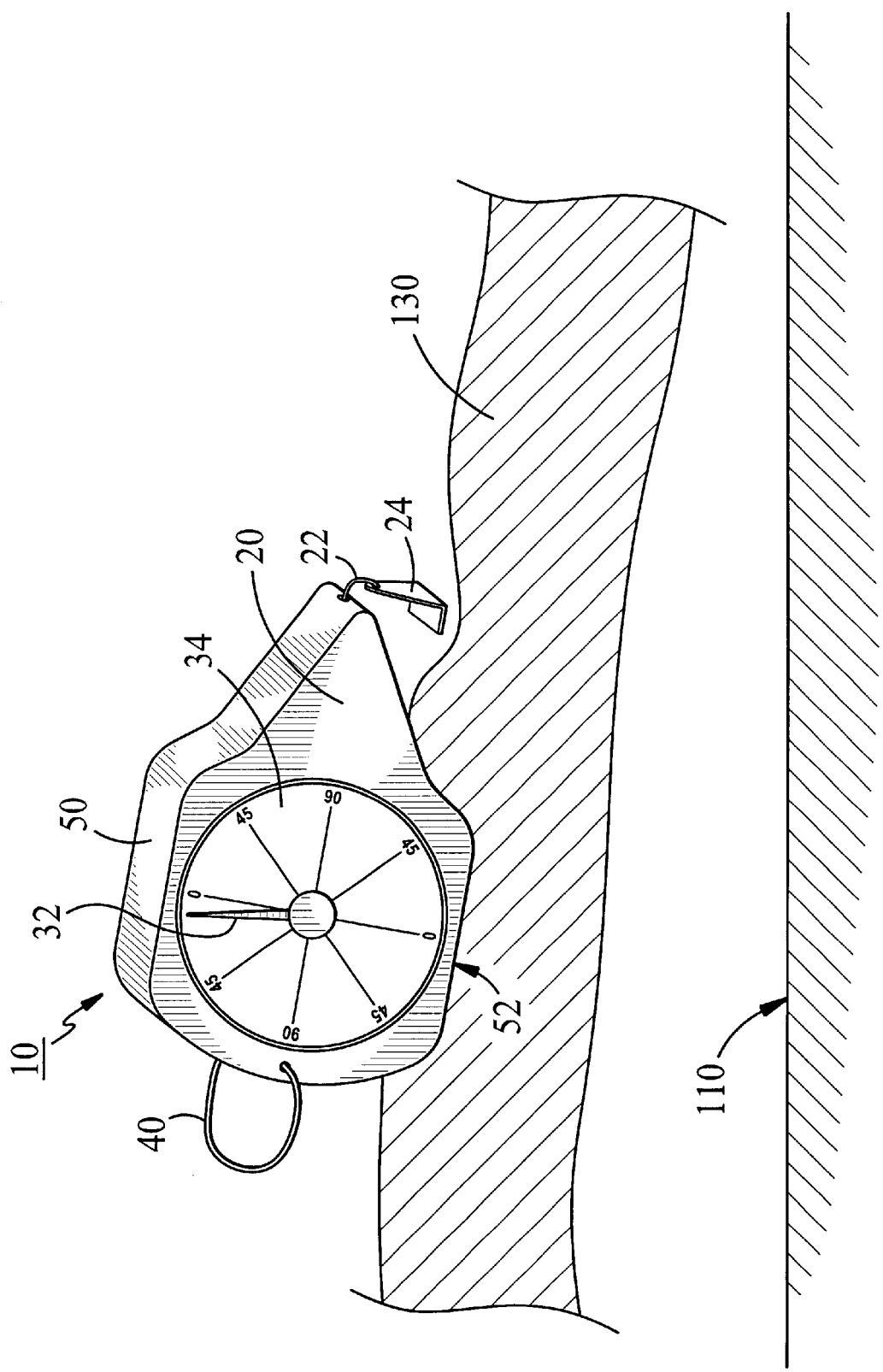
FIG. 5 is a side elevational view of the combination protractor/chalk line device being used to measure the angle of a surface.

FIG. 5 illustrates combination protractor/chalk line device 10 being used to measure the angle of a surface 130 which is inclined with respect to horizontal. Here, chalk line string 22 and handle 40 are not employed. Rather, flat surface 52 of housing 20 is placed directly on surface 130 and the angle of the surface is indicated by indicator needle 32 on scale of angles 34. Flat surface 50 is provided for the same purpose as flat surface 52 and may be used instead of the latter if more convenient to the user.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A combination protractor/chalk line device, comprising:
    (a) a housing;
    (b) a chalk line string disposed in said housing and withdrawable from said housing at a first end of said housing;
    (c) manually graspable handle means loosely attached to said housing at an attachment point a second end of said housing opposite said first end at all times said combination protractor/chalk line device is in use;
    (d) a protractor disposed on a side of said housing; and
    (e) said combination protractor/chalk line device being arranged such that, when said chalk line string is withdrawn from said housing and held taut and said handle means is grasped, said protractor will indicate an angle from horizontal defined by said chalk line string.

2. A combination protractor/chalk line device, as defined in claim 1, wherein: said protractor has an indicating needle always pointing vertically, and said protractor including an indicating scale disposed with respect to said indicating needle such that said indicating needle indicates an inclination from horizontal of said housing.

3. A combination protractor/chalk line device, as defined in claim 2, wherein: said indicating scale has opposing 90-degree marks defining a line which is horizontal when said needle indicates a zero-degree inclination from the horizontal of said housing.

4. A combination protractor/chalk line device, as defined in claim 3, wherein:

said attachment point is disposed at a second end of said housing opposite said first end such that, when said handle means is grasped and said chalkline string is withdrawn from said housing and held taut, said attachment point, said line, and said chalk line string are aligned or lie in a common plane.

5. A method of measuring an angle with a combination protractor/chalk line device, comprising:

(a) providing said combination protractor/chalk line device with a housing; a chalk line string disposed in said housing and withdrawable from said housing at a first end of said housing; manually graspable handle means loosely attached to said housing at an attachment point a second end of said housing opposite said first end at all times said combination protractor/chalk line device is in use; and a protractor disposed on a side of said housing; and (b) grasping said manually graspable handle means;

(c) withdrawing said chalk line string from said housing and holding said chalk line string taut; and (d) reading on said protractor an angle from horizontal defined by said chalk line string.

6. A method of measuring an angle with a combination protractor/chalk line device, as defined in claim 5, further comprising: providing said protractor with an indicating needle always pointing vertically, and said protractor including an indicating scale disposed with respect to said indicating needle such that said indicating needle indicates an inclination from horizontal of said housing.

7. A method of measuring an angle with a combination protractor/chalk line device, as defined in claim 6, further comprising: providing said indicating scale with opposing 90 degree marks defining a line which is horizontal when said needle indicates a zero-degree inclination from horizontal of said housing.

8. A method of measuring an angle with a combination protractor/chalk line device, as defined in claim 7, further comprising:

grasping said handle means and withdrawing said chalk line string from said housing and holding said chalk line string taut, such that said attachment point, said line, and said chalk line string are aligned or lie in a common plane.

* * * * *